SILICON CARBIDE SEMICONDUCTOR DEVICE
Filed July 31, 1959
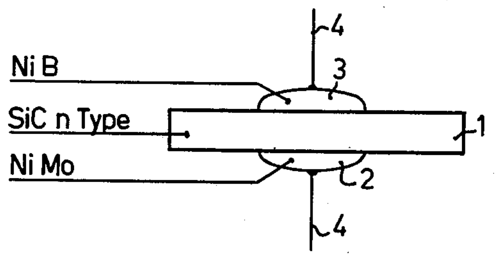
INVENTORS
WILHELMUS F. KNIPPENBERG
HUBERT J. VAN DAAL
ALBERT HUIZING
BY
Frank R. Jeifari
AGENT United States Patent Office 3,121,829

Patented Feb. 18, 1964

3,121,829

SILICON CARBIDE SEMICONDUCTOR DEVICE

Albert Huizing, Hubert Jan van Daal, and Wilhelmus Franciscus Knippenberg, all of Emmasingel, Eindhoven, Netherlands, assignors to North American Philips Company, Inc., New York, N.Y., a corporation of Delaware Filed July 31, 1959, Ser. No. 830,932
Claims priority, application Netherlands Aug. 26, 1958
6 Claims. (Cl. 317—237)

The invention relates to a semi-conductor device comprising a semiconductive body of siliconcarbide, to which one or more electrodes are applied. The invention furthermore relates to the manufacture of such semiconductor devices in which one or more electrodes are fused to a semiconductive body of siliconcarbide, and to the electrode material to be used in such semi-conductor devices.

Siliconcarbide is known to be a semi-conductor with a comparatively large gap between the valence band and the conduction band, so that it is particularly suitable for use in semi-conductor devices, for example, crystal rectifiers and transistors suitable for operating even at high temperatures such as 700° C. It has been suggested to use siliconcarbide as a semi-conductor in a semi-conductor device known under the name of p-n-radiation source.

With all these uses it is essential that suitable electrodes, both ohmic and rectifying electrodes, should be applicable to the siliconcarbide, which, as a rule, is in single crystal form for such uses; both in mechanical respect, for example the adhesion, and in electrical respect, for example, with ohmic electrodes the transition resistance and with rectifying electrodes the rectification factor, these electrodes have to fulfill high requirements. It is, moreover, important that it should be possible to apply the electrodes in a simple and reproduceable manner.

With the manufacture of semi-conductor devices of germanium and silicon the so-called alloying process is a conventional technique; in this case a quantity of electrode material containing active impurities, for example, of the donor- or acceptor-type, is fused to the semi-conductive body, a small quantity of the semi-conductor being thus dissolved in the melt of electrode material. During cooling first a thin layer of semi-conductive material with a percentage of active impurity is deposited from the melt on the body; then the remainder of electrode material with a percentage of semi-conductive material, if any, solidifies to form a metallic contact. With germanium and silicon rigid and electrically favourable electrodes can thus be obtained.

However, in practice, when using this in itself advantageous fusing technique with siliconcarbide, only unsatisfying results were obtained. Fusing to siliconcarbide many of the electrode materials commonly used in the said technique provide a poor adhesion or none at all or, in electrical respect, unfavourable electrodes.

The invention has for its object to provide a particular group of electrode materials suitable to form mechanically rigid electrodes on siliconcarbide by fusion and providing electrically advantageous electrodes. The object of the invention is, moreover, to provide a method by which these electrode materials can be fused to siliconcarbide in a simple and reproduceable manner.

In a semi-conductor device comprising a semi-conductive body of siliconcarbide, to which one or more electrodes are applied, at least one of these electrodes is, in accordance with the invention, formed by a satisfactorily adhering electrode fused to the body which consists, at least partly of one or more of the transition elements of the iron group. This electrode consists, preferably, at least mainly of one or more of the transition elements of the iron group. The expression "consisting mainly of" is to be understood to mean herein that, apart from the transition elements of the iron group, the electrode material may contain a percentage of an active impurity, for example, a donor required for its function and/or a percentage of a neutral impurity having an advantageous influence on the electrode or its application. The transition elements are to be understood to mean, as usual, the metals nickel, iron, chromium, cobalt and manganese.

In practice particularly suitable has been found to be a semi-conductor device according to the invention, in which at least one of the electrodes consists, at least mainly, of an alloy of one or more of the transition elements of the iron group with one or more of the high-melting-point transition elements fused to the body. The high-melting-point transition elements are to be understood to mean, as usual, the elements molybdenum, tungsten, tantalum, niobium, titanium, vanadium, zirconium and hafnium. These high-melting-point transition elements, as compared with the transition elements of the iron group, behave as substantially neutral elements in an electrical respect, i.e., their donor- or acceptor-effect, as compared with that of the elements of the iron group, is substantially negligible. By adding one or more of the high-melting-point transition elements the mechanical adhesion of the electrode is further improved and, moreover, this addition reduces the ferromagnetism of the alloy comprising the ferromagnetic elements of the iron group, for example, iron, nickel and cobalt, which may be desirable in certain uses. The said alloy contains, preferably, at the most 50 at. percent of one or more of the refractory transition elements. In excess of 50 at. percent the melting point of the alloy usually increases rapidly so that it is necessary to alloy at temperatures at which the semi-conductor device may change its properties (owing to diffusion at the high fusion temperature and the like). Alloys with less than 30 at. percent already have all desired properties with respect to flowing out or wettability, adhesion and electrical activity. Alloys with less than 50 at. percent may be fused, as a rule, already at temperatures between 1300° C. and 1600° C. The fusion temperatures of such alloys may, however, if desired, be chosen to be higher.

In a mechanical respect the said eectrode materials yield satisfactory electrodes, but also from an electrical point of view these electrodes are advantageous. With a semi-conductor device in which the semi-conductive body of silicon-carbide is, at least partly, of the n-type, a fused electrode consisting at least mainly of one or more of the transition elements of the iron group or at least mainly of an alloy of one or more of these transition elements with one or more of the high-melting-point transition elements is capable of yielding a suitable low-ohmic contact with an n-type part, whereas the same electrode materials according to the invention with a semi-conductor device in which the semi-conductive body is at least partly of the p-type can be fused to the body to form a suitable, rectifying electrode on a p-type portion. It may therefore be assumed that the transition elements of the iron group with respect to siliconcarbide have a donor character. By adding donors, for example, phosphorus, the donor character of the alloy may be improved. Owing to this donor addition the low transition resistance, which is already low without the addition, is further reduced with ohmic electrodes on n-type portions, while the rectification factor of rectifying electrodes on p-type portions is further improved. Apart from phosphorus other donors, such as bismuth, arsenic and antimony have been found to be suitable.

By adding an acceptor, for example, boron, instead of adding a donor, the donor character of the transition elements of the iron group or of their alloys with one or more of the substantially neutral, high-melting-point transition elements may be reduced or be neutralized with an adequate content of acceptor, or even be over-compensated into an acceptor character. Apart from boron other acceptors have been found to be suitable, such as indium, gallium or aluminum. Thus, when adding an acceptor, preferably more than 1 at. percent, to the electrode material in a semi-conductor device in which the semi-conductive body is, at least partly, of the p-type, such electrode material can provide a suitable ohmic electrode on the p-type portion. According as the acceptor content of the electrode material is higher, the lower will be the transition resistance, which may be reduced simply to less than a few tenths ohm.

The said electrode material with the acceptor addition may be used, in accordance with the acceptor content, also as an ohmic electrode or as a rectifying electrode on an n-type portion. It has been found that such electrode material with an acceptor content of at least 20 at. percent in a semi-conductor device in which the semi-conductive body consists of siliconcarbide and is at least partly of the n-type, can be alloyed to form a suitable ohmic electrode on an n-type portion. As stated above, such electrode material, preferably with an acceptor content of at least 1 at. percent is also suitable to form an ohmic electrode on a p-type portion, so that the electrode material of this composition has the advantage that irrespective of the type of body it can be used as an ohmic electrode. The electrode materials with an acceptor content between 3 and 12 at. percent are preferably used to this end. When increasing further the acceptor content, the donor character of the transition elements of the iron group is overcompensated. Thus, with a semi-conductor device in which the semi-conductive body is, at least partly, of the n-type, such electrode material with an acceptor content of at least 30 at. percent is particularly suitable to form a rectifying electrode on an n-type portion. The acceptor content may, however, be chosen not to be arbitrarily high, since at an excessive acceptor content the adhesion of the electrode is affected adversely. For this reason particularly with boron, the acceptor content to be used is lower than 40 at. percent.

It should be noted that the aforesaid percentages of content or those to be mentioned hereinafter for the constituents of the fusing material are calculated, as usual, on the basis of the quantity of electrode material applied prior to the fusion process. As a rule, these percentages deviate little from those of the electrode fused to the body. In those cases in which, for example, a volatile, active impurity is used as a constituent, the content in the fused electrode may be materially lower owing to evaporation during the fusing process, than in the electrode material to be fused. The limit values indicated for the acceptor content are not to be considered as extreme values, but as safe limits for each acceptor in general; they are therefore lying, as a rule, within the extreme limit values of each acceptor, liable to lead to the result aimed at. For example, when using aluminum as an acceptor, the change-over from the neutral character to the acceptor character occurs between 20 and 25 at. percent, whereas in the case of boron, it occurs from 30 at. percent upwards. Therefore, with aluminum as an acceptor, a rectifying electrode could be obtained on an n-type portion already at 25 at. percent. Apart from the acceptor itself, also the dosing of the siliconcarbide body at the fusing area may have an effect at the correct change-over point, since overcompensation of a low-ohmic region will occur only at a content of compensating impurities which is higher than in the case of a high-ohmic region.

According to a further aspect of the invention relating to the method of applying the electrode, the electrodes are fused to the siliconcarbide preferably in a pure, inert atmosphere, for example, in pure argon or helium. It has appeared to be advantageous to carry out the fusing process in a vacuum with a suitable low residual pressure, which may be obtained, for example, by rinsing first with a pure, inert gas and by subsequently reducing the pressure to, for example, 1 mm. Hg or less. The residual pressure is chosen, preferably, to be lower than $10^{-2}$ mm. Hg. Thus, any difficulties in the adhesion liable to occur, for example, with technical argon, are avoided.

The invention also relates to the electrode material and to the bodies formed from this electrode material, for example, wires, pellets, foils, the composition being as stated above for the fused electrodes to be used in a semi-conductor device or a method according to the invention.

The invention will now be explained more fully with reference to a few embodiments, of which the results are summarized in the following table.

| Example | Electrode or contact composition | Type of contact produced on SiC crystal of— | | Contact adhesion |
|---|---|---|---|---|
| | | n-type conduct | p-type conduct | |
| 1 | Ni | ohmic | rectifying | good. |
| 2 | Fe | do | do | Do. |
| 3 | Co | do | do | Do. |
| 4 | Mn | do | do | Do. |
| 5 | CrFe(48) | do | do | Do. |
| 6 | NiMo(6) | do | do | Do. |
| 7 | NiMo(20) | do | do | Do. |
| 8 | NiMo(38) | do | do | Do. |
| 9 | NiMo(52) | do | do | Fusing temperature, 1,650° C. |
| 10 | FeW(10) | do | do | good. |
| 11 | CoTa(12) | do | do | Do. |
| 12 | MnNb(5) | do | do | Do. |
| 13 | NiB(0.6) | do | do | Do. |
| 14 | FeB(0.3) | do | do | Do. |
| 15 | CoAl(0.8) | do | do | Do. |
| 16 | NiB(2) | do | ohmic | Do. |
| 17 | FeAl(5) | do | do | Do. |
| 18 | CoGa(3) | do | do | Do. |
| 19 | NiMo(10)B(10) | do | do | Do. |
| 20 | NiMo(25)B(8) | do | do | Do. |
| 21 | NiB(30) | rectifying | do | Do. |
| 22 | NiB(36) | do | do | Do. |
| 23 | NiB(42) | do | do | bad. |
| 24 | FeAl(26) | do | do | good. |
| 25 | NiAl(35) | do | do | Do. |
| 26 | CoIn(28) | do | do | Do. |
| 27 | NiMo(10)B(35) | do | do | Do. |
| 28 | NiTa(20)Al(30) | do | do | Do. |
| 29 | NiP(6) | ohmic | rectifying | |
| 30 | NiAs(5) | do | do | |
| 31 | CoAs(3) | do | do | |

The first column of this table indicates a large number of different compositions of electrode material. The foremost constituent is always associated with the transition elements of the iron group. When the electrode material is formed by an alloy of a plurality of constituents, the content of the alloy of the constituents added to the transition elements of the iron group is indicated in atom percent directly after the constituent concerned. The different metal alloys were produced by melting together the constituents in their proper weights in a quartz or alumina crucible in a closed system, in which a very pure gas atmosphere prevailed, obtained, for example, by previously rinsing three times with pure argon, and then establishing a vacuum by pumping each time to about $10^{-3}$ mm. Hg. The pure argon gas contained less than 0.001% of nitrogen, less than 0.003% of water vapour and less than 0.001% of oxygen. By known techniques pellets having a diameter of about 0.5 to 1 mm. were made from the alloys or elements used in the tests. For each test of each example of a composition four pellets were used of which two had the same known standard composition and the other two each had the composition to be tested. All four pellets were fused onto one side of a siliconcarbide monocrystal plate of a diameter of about 1 cm. and a thickness of about 0.5 mm. in a graphite crucible in a pure atmosphere, which had previously been rinsed three times with the aforesaid pure argon gas and brought each time to a vacuum of about $10^{-3}$ mm. Hg As will be evident the term "very pure gas atmosphere" is being used to refer to both the pure rare gas and a substantially high vacuum.

For the standard electrodes use was generally made of alloys of Ni(80)Mo(10)B(10), which yield ohmic contacts both on n-type portions and on p-type portions. The fusing process was carried out so that the assembly was each time heated in excess of the melting temperature of the electrode material, after which it was kept at this temperature for about one minute. The fusing temperatures lie, in general, between 1200° C. and 1500° C. In order of succession the four pellets as previously described were fused onto an n-type and a p-type siliconcarbide plate. The siliconcarbide employed had, each time, a specific resistance between 0.1 and 10 ohm-cm. Previously the siliconcarbide plate had been degreased, for example with acetone, and, if necessary, sand-blasted and polished. Comparison tests were carried out with high-ohmic siliconcarbide, which, in general, led to the same results. The columns 2 and 3 indicate the properties of the fused electrode material with respect to n-type and p-type siliconcarbide, obtained by electrical measurements. If not indicated otherwise, "ohmic" is to be understand to mean low-ohmic, i.e., the transition resistance is negligibly small; substantially no voltage dependence could be found. The term "rectifying" is to be understood to mean that the rectification factor was between 10 and 1000; it should be noted here that the rectification factor was higher according as the electrode material contained more acceptors on n-type portions and more donors on p-type portions. It sometimes appeared to be necessary for the measurement, to sandblast the crystal plate to remove surface impurities precipitated on the plate during the fusing process. By a suitable etching agent, for example, concentrated $HNO_3$ and/or $KClO_3$, these rectification factors may, in general, be improved. The fourth column provides an indication of the mechanical properties, particularly the adhesion. A good adhesion is to be understood to mean that the electrode can be torn from the crystal practically only at the risk of taking SiC along with it, whereas in the case of a bad adhesion the electrode can be removed from the plate without taking SiC along with it.

The electrode materials according to the invention may be used for all semi-conductor devices of siliconcarbide. A suitably crystal rectifier may be obtained, for example, by fusing a rectifying and an ohmic electrode opposite each other onto a siliconcarbide monocrystal plate of a given conductivity type. This is illustrated in the sole figure in the accompanying drawing, which is a schematic end view of a suitable rectifying structure. Referring specifically to the drawing, there is shown therein a monocrystalline siliconcarbide wafer 1 having a diameter of about 1 cm. and a thickness of about 0.5 mm. The crystal had n-type conductivity with a resistivity of about 1 ohm-cm. On opposite sides of the wafer 1 were simultaneously fused a nickel molybdenum alloy pellet 2 containing 20 at. percent of molybdenum and a nickel boron pellet 3 containing 30 at. percent of boron by heating the whole at about 1500° C. in vacuum. Nickel leads 4 may be soldered to the exposed contact and then the wafer 1 may be etched briefly in $HNO_3$ to clean its surfaces. The pellet 2 established an ohmic connection to the wafer 1, and the pellet 3 a rectifying connection to the wafer 1.

A further, very advantageous possibility of manufacturing a crystal rectifier consists in that an ohmic electrode is fused onto the p-type portion and onto the n-type portion of a siliconcarbide monocrystal plate comprising a pn-transition, which is introduced into the plate during the growth of the crystal, so that a suitable rectifier is obtained. It will be obvious that the said fused electrodes may be used in many ways in the manufacture of a semiconductor device of siliconcarbide. Although it is to be preferred, if one is concerned with electrode material having a plurality of constituents, to apply the alloy of these constituents to the body and to fuse them thereon, the constituents may, as an alternative be separately fused or added. The electrode materials according to the invention have proved to be suitable also to form an electrode constituting a bond between a supporting body and the siliconcarbide body. Thus, for example, a SiC-crystal plate may be melted via an iron alloy between two copper supporting bodies with the aid of local high-frequency heating, so that a crystal rectifier for high currents is obtained. Suitable supporting bodies are, for example, also with respect to the electrode materials according to the invention, the materials tungsten, molybdenum, tantalum, and nickel-cobalt-iron alloys, for example an alloy of 54% by weight of Fe, 28% by weight of Ni and 18% by weight of Co. If the melting point of the supporting body exceeds that of the electrode material, the adhesion may be obtained, if desired, by local high-frequency heating, whereas, if the melting temperature of the electrode material is lower than that of the supporting body, the adhesion may be obtained by heating the assembly in a furnace in excess of the melting temperature of the electrode material and below that of the supporting body.

Although the foregoing relates, in general, to the use of the electrodes on a siliconcarbide monocrystal, the electrode materials according to the invention referred to above may be alloyed in a semi-conductor device onto a polycrystalline siliconcarbide body, for example sintered SiC bodies.

What is claimed is:

1. A semiconductor device comprising a semiconductive substantially monocrystalline body of silicon carbide, and an electrode-forming prealloyed mass fused and melted to said body and adherent thereto, said mass comprising an alloy of at least one element selected from a first group consisting of nickel, cobalt, iron, manganese and chromium, at least one element selected from a second group consisting of molybdenum, tungsten, tantalum, niobium, titanium, vanadium, zirconium and hafnium, the element of the second group being present in an amount more than zero but not more than 30 at. percent of the alloy, and an element selected from a third group consisting of acceptors and donors.

2. A device as set forth in claim 1 wherein the donor is phosphorus.

3. A device as set forth in claim 1 wherein the acceptor is boron.

4. A semiconductor device comprising a semiconductive body of silicon carbide, and an electrode-forming prealloyed mass fused and melted to said body and adherent thereto and forming an electrical connection therewith, said mass comprising principally an alloy of nickel and more than zero and up to 30 at. percent of molybdenum.

5. A device as set forth in claim 4 wherein the alloy further includes up to 40 at. percent of an element selected from the group consisting of acceptors and donors.

6. A semiconductor device as set forth in claim 4 wherein the alloy contains nickel as a major constituent, and molybdenum and boron as minor constituents.

References Cited in the file of this patent

UNITED STATES PATENTS

| | | |
|---|---|---|
| 2,273,704 | Grisdale | Feb. 17, 1942 |
| 2,918,396 | Hall | Dec. 22, 1959 |
| 2,937,323 | Kroko et al. | May 17, 1960 |

OTHER REFERENCES

Northcutt: Molybdenum, Butterworth Scientific Publication, London, 1956 (pages 130–131).